United States Patent
Pendlebury (10) Patent No.: US 9,090,183 B1
(45) Date of Patent: Jul. 28, 2015

(54) VEHICLE ARMREST SUPPORT

(71) Applicant: Ford Global Technologies, LLC, Dearborn, MI (US)

(72) Inventor: Jonathan Robert Pendlebury, Torquay (AU)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/159,236

(22) Filed: Jan. 20, 2014

(51) Int. Cl.
| | |
|---|---|
| A47C 7/62 | (2006.01) |
| A47C 7/70 | (2006.01) |
| A47C 7/72 | (2006.01) |
| B60N 2/46 | (2006.01) |
| B60R 11/00 | (2006.01) |
| B60N 3/10 | (2006.01) |

(52) U.S. Cl.
CPC .............. *B60N 2/468* (2013.01); *B60N 2/4606* (2013.01); *B60N 3/102* (2013.01); *B60R 2011/0007* (2013.01); *B60R 2011/0014* (2013.01)

(58) Field of Classification Search
CPC .............. B60R 2011/0007; B60R 2011/0014; B60N 3/102
USPC ............. 297/188.14, 188.15, 188.16, 188.17, 297/188.19, 217.3; 248/240, 311.2, 685; 296/24.34
See application file for complete search history.

(56) References Cited

U.S. PATENT DOCUMENTS

| | | | |
|---|---|---|---|
| 5,556,017 A * | 9/1996 | Troy .................... | 297/188.17 X |
| 5,562,331 A * | 10/1996 | Spykerman et al. ..... | 297/188.16 |
| 6,102,476 A * | 8/2000 | May et al. .................. | 297/217.3 |
| 6,217,112 B1 * | 4/2001 | Linsenmeier et al. ... | 297/188.19 X |
| 6,382,745 B1 * | 5/2002 | Adkins ...................... | 312/223.3 |
| 6,470,809 B1 | 10/2002 | Herbert | |
| 6,863,344 B2 * | 3/2005 | Smallhorn ................. | 297/217.3 |
| 6,910,734 B2 * | 6/2005 | Steelman ................... | 297/217.3 |
| 6,997,508 B2 * | 2/2006 | Jaaska, Sr. ................ | 297/188.15 |
| 7,114,772 B2 * | 10/2006 | Kobayashi et al. .. | 297/188.19 X |
| 7,413,229 B2 * | 8/2008 | Kukucka et al. .......... | 296/24.34 |
| 7,623,958 B1 * | 11/2009 | Laverick et al. ............. | 701/444 |
| 7,793,597 B2 | 9/2010 | Bart et al. | |

(Continued)

FOREIGN PATENT DOCUMENTS

| | | |
|---|---|---|
| KR | 1020060004796 A | 1/2006 |
| WO | 9605081 A1 | 2/1996 |

OTHER PUBLICATIONS

Havis, Inc., "Docking Station for Panasonic Toughbook CF-53 laptop computer," http://www.havis.com/products/DEVMT_DOCKST_PAN_53-42360-1005.html, 2013 (2 pages).

(Continued)

*Primary Examiner* — Rodney B White
(74) *Attorney, Agent, or Firm* — Vichit Chea; Price Heneveld (57) ABSTRACT

A deployable or fixed armrest support for a vehicle includes an elongate body operable between a vertical stowed position and a horizontal deployed position. The elongate body is configured to support the weight of a passenger in the vehicle. An extendable support is configured to be withdrawn from a cavity in the elongate body. The extendable support is operable between a deployed position and a stowed position. A plurality of spokes are disposed on and configured to rotate about a distal end of the deployable armrest support. The plurality of spokes including polymeric pads configured to support a portable computing device. One of a power port and a data port is disposed on the elongate body.

20 Claims, 5 Drawing Sheets

(56) References Cited

U.S. PATENT DOCUMENTS

| | | | |
|---|---|---|---|
| 7,946,542 B1 | 5/2011 | Chapman | |
| 8,267,472 B2* | 9/2012 | Large et al. | 297/217.3 |
| 2002/0089217 A1* | 7/2002 | Scheerhorn | 297/188.19 |
| 2003/0122392 A1* | 7/2003 | Larsen et al. | 296/24.1 |
| 2004/0217615 A1* | 11/2004 | Lindstrom et al. | 296/24.34 |
| 2005/0067866 A1* | 3/2005 | Luong | 297/217.3 |
| 2006/0249632 A1* | 11/2006 | McKelvey | 297/217.3 X |
| 2009/0152915 A1* | 6/2009 | Krasna et al. | 297/217.3 |
| 2010/0075755 A1* | 3/2010 | Steelman | 297/217.3 X |
| 2010/0090491 A1* | 4/2010 | Hipshier et al. | 296/24.34 |
| 2011/0012403 A1* | 1/2011 | Wilson et al. | 297/217.3 |
| 2011/0175408 A1* | 7/2011 | Ridler et al. | 297/188.16 |
| 2012/0200129 A1* | 8/2012 | Wilson, Jr. | 297/217.3 |
| 2013/0038280 A1* | 2/2013 | Boundy et al. | 320/108 |
| 2013/0082492 A1* | 4/2013 | Andersson et al. | 297/188.17 |
| 2013/0264851 A1* | 10/2013 | Kim et al. | 297/217.3 |

OTHER PUBLICATIONS

First Mobile Technologies, "In-Vehicle Mounting Solutions | Docking Stations | Install Services," http://www.firstmobiletechnologies.com/images/FMTcatalog2010.pdf (45 pages).

* cited by examiner

VEHICLE ARMREST SUPPORT

FIELD OF THE INVENTION

The present invention generally relates to an armrest support for a vehicle, and more specifically, to an armrest support configured to detachably support a portable computing device for a vehicle.

BACKGROUND OF THE INVENTION

Armrest supports are generally used in vehicles to provide additional comfort to passengers. In addition, armrest supports that have increased utility and functionality can assist passengers that are attempting to conduct work activities and use portable computing devices inside the vehicle.

SUMMARY OF THE INVENTION

According to one aspect of the present invention, an armrest for a vehicle includes an elongate body operable between a vertical stowed position and a horizontal deployed position. The elongate body is configured to support the weight of an arm of a passenger in the vehicle. An extendable support is configured to be withdrawn from a cavity in the elongate body. The extendable support is operable between a deployed position and a stowed position. A plurality of spokes are disposed on and configured to rotate about a distal end of the extendable support. The plurality of spokes include polymeric pads configured to support a portable computing device. One of a power port and a data port is disposed on the elongate body.

According to another aspect of the present invention, a vehicle armrest includes an elongate body operable between a vertical stowed position and a horizontal deployed position. An extendable support is configured to be withdrawn from a cavity in the elongate body. A plurality of spokes are disposed on and configured to rotate about a distal end of the extendable support. The plurality of spokes include polymeric pads configured to support a portable computing device.

In yet another aspect of the present invention, a vehicle armrest includes an elongate body operable between a vertical stowed position and a horizontal deployed position. A raised gasket projects upward from a top surface of the elongate body when the elongate body is in the horizontal deployed position and is configured to frictionally engage a portable computing device. An interface button is configured to secure an underside of the portable computing device.

In still another aspect of the present invention, a vehicle armrest is configured for deployable use or fixed us. The vehicle armrest is operable to securely support a portable computing device and includes power and data ports. The vehicle armrest can also support tablets, books, magazines, food trays, etc.

These and other aspects, objects, and features of the present invention will be understood and appreciated by those skilled in the art upon studying the following specification, claims, and appended drawings.

DETAILED DESCRIPTION OF EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
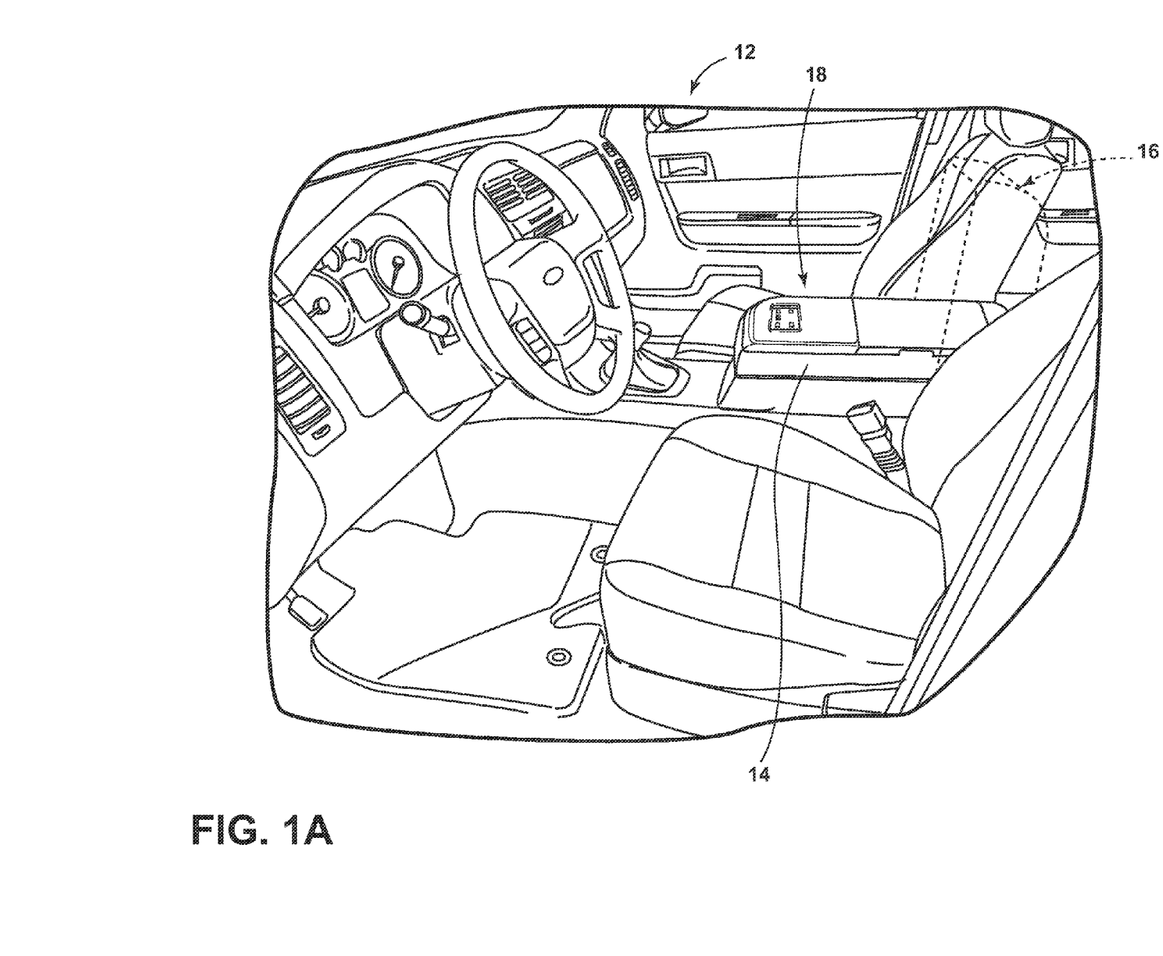
FIG. 1A is a top perspective view of an interior portion of a vehicle incorporating one embodiment of an armrest of the present invention.
Figure 1B:
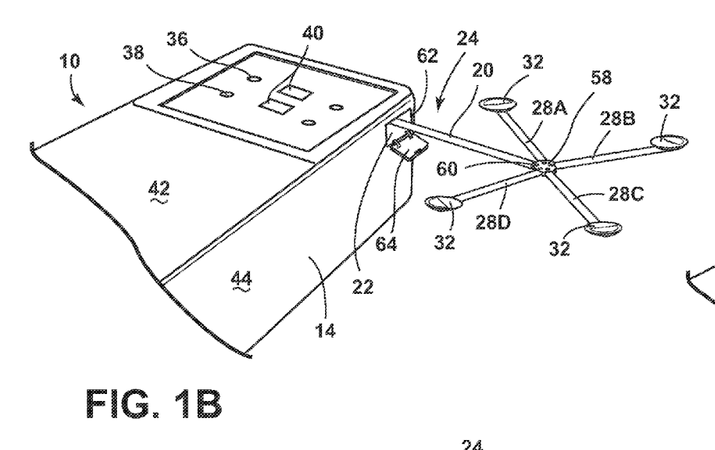
FIG. 1B is a top perspective view of another embodiment of a laptop armrest support with an extendable support in an extended position.
Figure 1C:
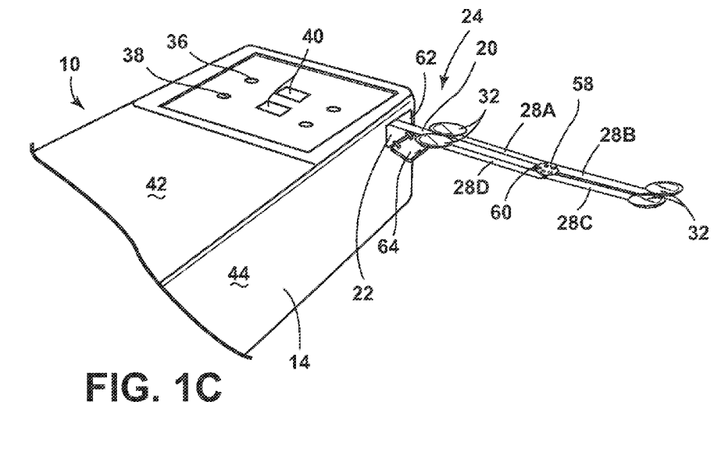
FIG. 1C is a top perspective view of the laptop armrest support of FIG. 1B with the extendable support being moved to a stowed position.
Figure 1D:
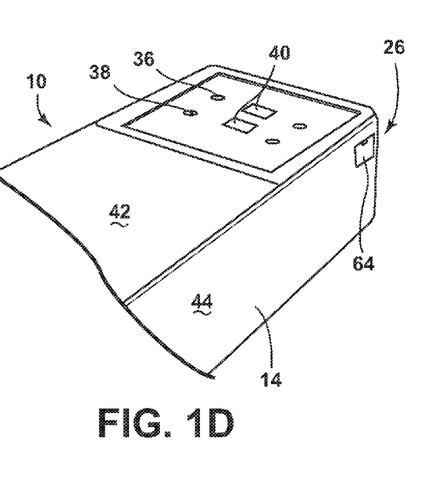
FIG. 1D is a top perspective view of the laptop armrest support of FIG. 1B with the extendable support in the stowed position.

As shown in FIGS. 1A and 1B, reference numeral 10 generally refers to an armrest for a vehicle 12 that includes an elongate body 14 operable between a vertical stowed position 16 and a horizontal deployed position 18. The elongate body 14 is configured to support the weight of an arm of a passenger in the vehicle 12. An extendable support 20 is configured to be withdrawn from a cavity 22 in the elongate body 14. The extendable support 20 is operable between a deployed position 24 and a stowed position 26. A plurality of spokes 28A, 28B, 28C, 28D are disposed on and configured to rotate about a distal end 30 of the extendable support 20. The plurality of spokes 28A, 28B, 28C and 28D include polymeric pads 32 configured to support a portable computing device 34. At least one of a power port 36 and a data port 38 is disposed on the elongate body 14. Alternatively, an inductive power mat or inductive power pad could be utilized.

With reference to the embodiment illustrated in FIG. 1B, the armrest 10 is operable between vertical and horizontal positions, wherein in the vertical position, the armrest 10 is generally stowed in a vehicle seatback, and in the horizontal position, the armrest 10 includes a top surface 42 that is available to support the weight of an arm of a passenger and includes interface controls 40 that control use of the power and data ports 36, 38. It will be understood that the power and data ports 36, 38 could also be located on a side, a front, an underside, or separate from, but in close proximity to, the armrest 10. The interface controls 40 are located in a control panel 41. The extendable support 20, however, is designed for supporting the weight of at least one portable computing device 34 (see FIG. 2A). In the illustrated embodiment, the extendable support 20 moves through a sidewall 44 of the elongate body 14 of the armrest 10. It is contemplated that the extendable support 20 may be spring-biased to the deployed position 24 (FIG. 1B) or the stowed position 26 (FIG. 1D) inside the armrest 10, and that a stop mechanism may be used to position the deployed position 24 and the stowed position 26.

Figure 1E:
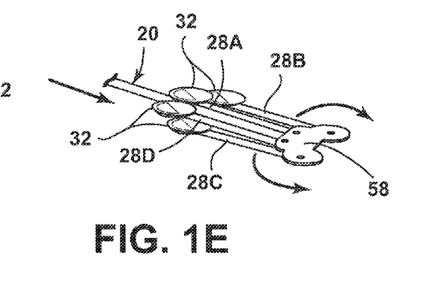
FIG. 1E is a top perspective view of the laptop armrest support of FIG. 1B with another embodiment of an extendable support.

In the illustrated embodiment of FIG. 1B, the four separate rotatable spokes 28A, 28B, 28C, 28D are coupled with a hub 58 disposed about a distal end 30 of the extendable support 20. The spokes 28A, 28B, 28C, 28D are independently rotatable relative to the hub 58 on the distal end 30 of the extendable support 20 and can be positioned in any of a variety of configurations. In another embodiment, the spokes 28A, 28B, 28C, 28D are formed from two main elongate members that are folded together in a scissor-like configuration. In this instance, it is generally contemplated that spoke 28A and spoke 28C are aligned and integrally connected and form one elongate member. Similarly, spokes 28B and 28D are aligned and integrally connected and form another elongate member. The two main elongate members can then be generally aligned with the extendable support 20 and received into a recess 62 defined in the elongate body 14 of the armrest 10. In yet another embodiment, the four elongate members may also be configured to fold independent, as shown in FIG. 1E. The recess 62 may include a door 64 that is rotatable or slides over the recess to conceal the extendable support 20 therein. It is contemplated that the extendable support 20, as well as the spokes 28A, 28B, 28C and 28D, may be constructed from a metallic material or a polymeric material. In addition, the polymeric pads 32 disposed at the distal end 30 of each of the spokes 28A, 28B, 28C and 28D may be formed from a variety of materials, and further may include a suction cup type construction designed to securely engage via suction an underside 70 of the portable computing device 34.

With reference to FIGS. 1A-1D, the illustrated armrest 10 is generally designed to provide comfort and support to a passenger by providing a resting surface for a passenger's arm. The armrest 10 includes one or more power and data ports 36, 38, or may include inductive power mats or inductive power pads that are available for use by the passenger to couple the portable computing device 34, such as a laptop or a tablet, to the vehicle 12. It is contemplated that the vehicle 12 may include Bluetooth® and Wi-Fi connectivity, as well as satellite connectivity, for purposes of transferring data to and from the portable computing device 34. In addition, it is contemplated that the power port 36 can be configured to receive any of a variety of adapters to aid in powering the portable computing device 34.

Alternatively, as shown in the embodiment illustrated in FIG. 1E, the armrest 10 may include an asymmetric hub that allows for each of the spokes 28A, 28B, 28C, 28D to fold rearward prior to reception into the cavity 22 in the elongate body 14. In this instance, the hub 58 is configured to allow each of the spokes 28A, 28B, 28C, 28D to be movable to a variety of extended positions and also to be moved such that each of the spokes 28A, 28B, 28C, 28D are generally parallel and directed toward the elongate body 14 of the armrest 10.

Figures 2A, 2B:
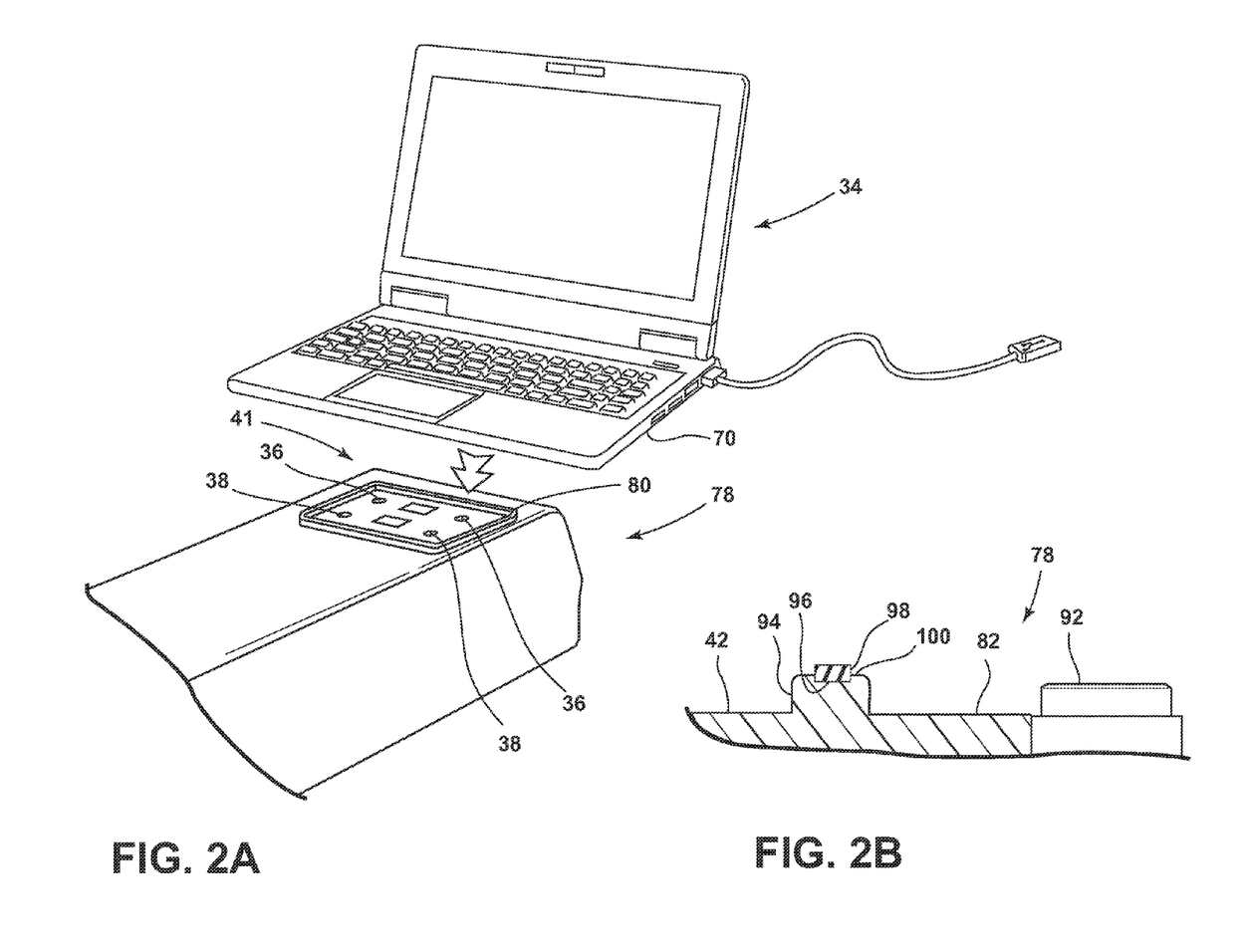
FIG. 2A is a top perspective view of another embodiment of a laptop armrest support of the present invention.
FIG. 2B is an enlarged partial cross-sectional view of a portion of the laptop armrest support of FIG. 2A.

With reference to FIGS. 2A and 2B, another embodiment of the present invention includes an armrest assembly 78 that includes a raised gasket 80 that extends over the top surface 42 of the elongate body 14 of the armrest 10. The raised gasket 80 is designed to frictionally secure the portable computing device 34 and maintain the portable computing device 34 in a particular configuration relative to a passenger. The raised gasket 80 may be made of a variety of materials, including polymers that have a high coefficient of friction, which aids in maintaining the portable computing device 34 in a particular orientation relative to the passenger. As illustrated, the raised gasket 80 includes a generally rectangular configuration. It is also contemplated that the raised gasket 80 may take on a variety of other configurations, such as being circular or triangular. An internal space 82 defined by the raised gasket 80 includes a plurality of power and data ports 36, 38 designed to interface with the portable computing device 34. In addition, a securing member or button 92 may be disposed inside the internal space 82 and is designed to lock down or securely engage the portable computing device 34 to minimize the likelihood that the portable computing device 34 will fall off the armrest 10 during travel.

With reference to FIG. 2B, in one embodiment, the raised gasket 80 is raised by a metallic or hard plastic rim 94 that extends upwardly from the top surface 42 of the armrest 10. The rim 94 includes a channel 96 defined therein configured to support a ridge gasket 98 that extends across a top portion 100 of the rim 94. It is contemplated that the rim 94 can extend upwardly from the top surface 42 of the armrest 10 and can be integrally formed with the armrest 10 or be a secondary piece that is secured to the top surface 42 of the armrest 10.

Figure 3A:
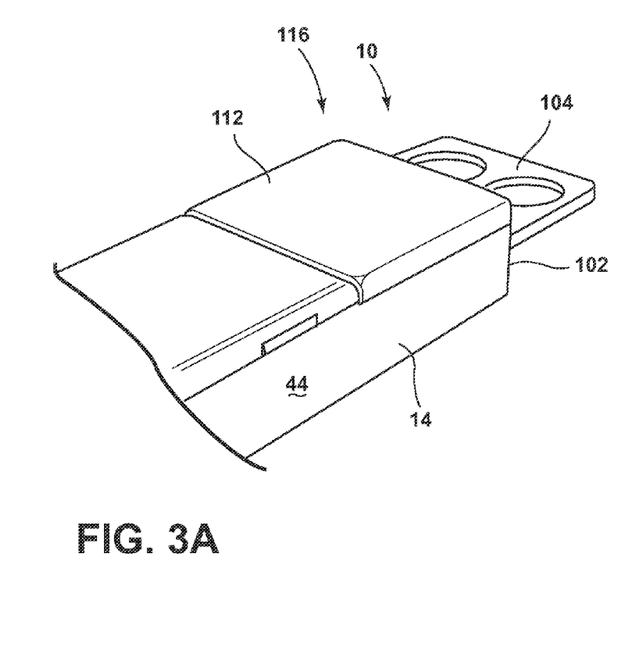
FIG. 3A is a top perspective view of another embodiment of a laptop armrest support with a cover in an extended position.
Figure 3B:
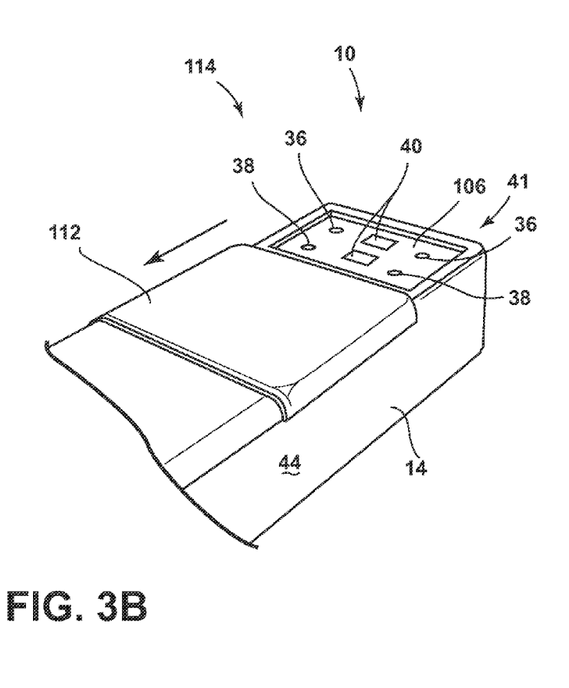
FIG. 3B is a top perspective view of the laptop armrest support of FIG. 3A with the cover in a retracted position.

With reference now to FIGS. 3A and 3B, in another embodiment of the armrest 10 of the present invention, the elongate body 14 includes a front portion 102 configured to retractably receive a cupholder assembly 104. In addition, the elongate body 14 includes the control panel 41 on the top surface 42 thereof that includes interface controls 40 for power and data, as well as power and data ports 36, 38. A slidable cover 112 is positioned over the control panel 41 and is movable between a refracted position 114 and an extended position 116. In the retracted position 114, controls 40 to the control panel 41 are generally available. In the extended position 116, the slidable cover 112 extends over the controls 40 and is unavailable to a user. It is also contemplated that the slidable cover 112 may be lockable, such that certain passengers can be restricted from access to the control panel 41.

Figure 4:
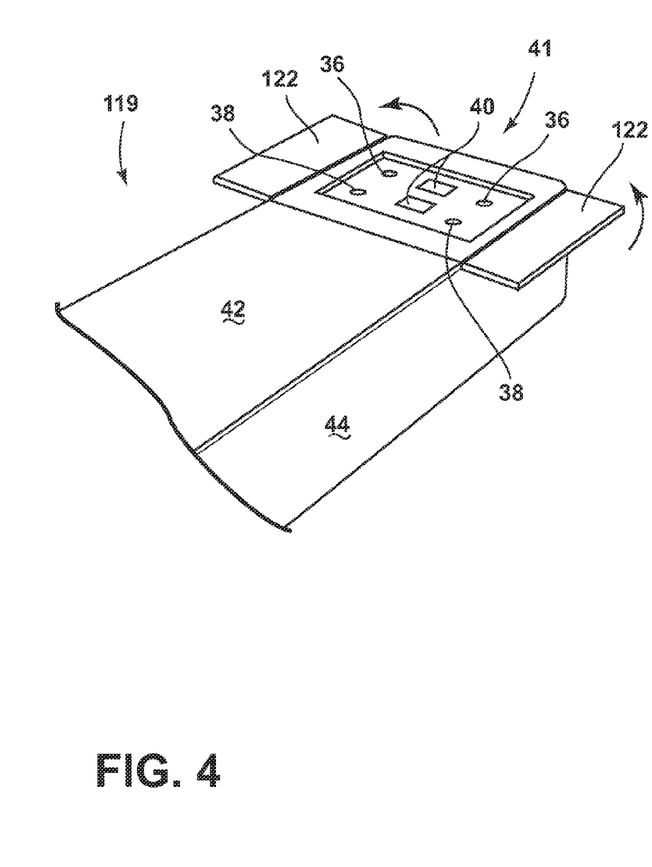
FIG. 4 is a top perspective view of yet another embodiment of a laptop armrest support with rotatable panel covers.

Referring now to FIG. 4, yet another embodiment of the present invention includes an armrest assembly 119 having rotatable panel covers 122 that are operable between a covered position and an open position on the top surface 42 of the armrest 10. In the covered position, the control panel 41 is generally unavailable and inaccessible by a user. It is contemplated that in the covered position, the panel covers 122 may be locked, such that access is not available to certain passengers. The panel covers 122 are operable via rotation to the open position 124 in which access to the control panel 41 is available. A tactile material that includes a high coefficient of friction configured to engage an underside of the portable computing device 34 is disposed on the panel covers 122. Accordingly, at least one portable computing device 34 can be securely supported on the panel covers 122. The panel covers 122 are adapted to rotate approximately 180 degrees such that the panel covers 122 are coplanar with the top surface 42 when in the open position 124.

Figure 5:
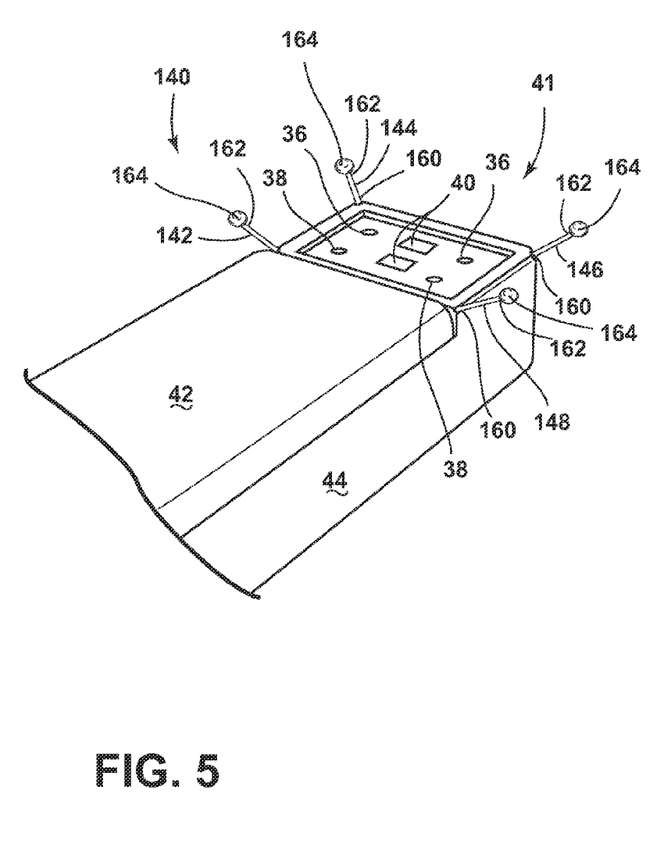
FIG. 5 is a top perspective view of another embodiment of a laptop armrest support with a plurality of deployable arms.

With reference now to FIG. 5, yet another embodiment of the present invention includes an armrest assembly 140 having a plurality of deployable arms 142, 144, 146, 148 that extend generally from each of four corners of the control panel 41. The plurality of deployable arms 142, 144, 146, 148 may extend laterally, vertically, or at an angle relative to the control panel 41. A proximal end 160 of the plurality of deployable arms 142, 144, 146, 148 includes a stop, which prevents the plurality of deployable arms 142, 144, 146, 148 from being removed completely from the armrest assembly 140. A distal end 162 of the plurality of deployable arms 142, 144, 146, 148 includes an interface member 164 that has a tactile material with a high coefficient of friction that is configured to engage an underside 70 of the portable computing device 34. In this configuration, the portable computing device 34 is supported on the plurality of deployable arms 142, 144, 146, 148. However, it is also contemplated that more or less arms may be made available to support the portable computing device 34. The interface member 164, as illustrated, includes a circular construction. However, it will be noted that the interface members 164 could be planar, rounded, square, etc.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. An armrest for a vehicle, comprising:
   an elongate body operable between a vertical stowed position and a horizontal deployed position, the elongate body being configured to support the weight of an arm of a passenger in the vehicle;
   an extendable support configured to be withdrawn from a cavity in the elongate body, the extendable support operable between a deployed position and a stowed position;
   a plurality of spokes disposed on and configured to rotate about a distal end of the extendable support, the plurality of spokes including polymeric pads configured to support a portable computing device; and
   one of a power port and a data port disposed on the elongate body.

2. The armrest of claim 1, wherein the plurality of spokes are generally equidistantly spaced about the distal end of the extendable support.

3. The armrest of claim 1, wherein the plurality of spokes includes two spokes, each of which is connected at a center portion thereof to the extendable support.

4. The armrest of claim 1, wherein the extendable support is extendable through a sidewall of the elongate body.

5. The armrest of claim 1, wherein the extendable support and the plurality of spokes are all constructed from a metallic material.

6. The armrest of claim 1, wherein the polymeric pads include a suction cup type construction.

7. An armrest for a vehicle comprising:
   an elongate body operably coupled with the vehicle;
   an extendable support configured to be withdrawn from a cavity in the elongate body; and
   a plurality of spokes disposed on and configured to rotate about a distal end of the extendable support, the plurality of spokes including polymeric pads configured to support a portable computing device.

8. The armrest of claim 7, wherein the plurality of spokes are generally equidistantly spaced about the distal end of the extendable support.

9. The armrest of claim 7, wherein the plurality of spokes includes two spokes, each of which is connected to a center portion thereof to the extendable support.

10. The armrest of claim 7, wherein the extendable support is extendable through a sidewall of the elongate body.

11. The armrest of claim 7, wherein the spokes extend upwardly from the distal end of the extendable support.

12. The armrest of claim 7, wherein the extendable support and the plurality of spokes are all constructed from a metallic material.

13. The armrest of claim 7, wherein the polymeric pads include a suction cup construction.

14. The armrest of claim 7, wherein the elongate body includes at least one of a power port and a data port.

15. The armrest of claim 7, wherein the elongate body includes a control panel on a top surface thereof.

16. A vehicle armrest comprising:
   an elongate body operable between a vertical stowed position and a horizontal deployed position;
   a raised gasket projecting upward from a top surface of the elongate body when the elongate body is in the horizontal deployed position and configured to frictionally engage a portable computing device; and an interface button configured to secure an underside of the portable computing device.

17. The vehicle armrest of claim 16, wherein the raised gasket is made of a polymeric material.

18. The vehicle armrest of claim 16, wherein the raised gasket includes a generally rectangular configuration.

19. The vehicle armrest of claim 16, wherein the elongate body includes at least one of a data and power port.

20. The vehicle armrest of claim 19, wherein the at least one of a data and power port is disposed within a spaced defined by the raised gasket.

* * * * *